United States Patent
Choren et al.

(10) Patent No.: US 12,250,416 B2
(45) Date of Patent: Mar. 11, 2025

(54) SYSTEM FOR COMMUNICATING SENSATIONS FROM A FIRST PERSON PERSPECTIVE

(71) Applicant: Interactive Cyber Experience Holdings, LLC, Sheridan, WY (US)

(72) Inventors: Michael Choren, Matthews, NC (US); Jonathan Holloman Metcalf, Charlotte, NC (US); Brian Hallett Payne, Charlotte, NC (US); Jonathan Holloman Metcalf, Jr., Charlotte, NC (US); Douglas Earl Brafford, Charlotte, NC (US)

(73) Assignee: Interactive Cyber Experience Holdings, LLC, Sheridan, WY (US)

( * ) Notice: Subject to any disclaimer, the term of this patent is extended or adjusted under 35 U.S.C. 154(b) by 0 days.

(21) Appl. No.: 18/249,961

(22) PCT Filed: Oct. 20, 2021

(86) PCT No.: PCT/US2021/055790
§ 371 (c)(1),
(2) Date: Apr. 20, 2023

(87) PCT Pub. No.: WO2022/087091
PCT Pub. Date: Apr. 28, 2022

(65) Prior Publication Data
US 2023/0396815 A1  Dec. 7, 2023

Related U.S. Application Data

(60) Provisional application No. 63/094,382, filed on Oct. 21, 2020.

(51) Int. Cl.
*H04N 21/2187* (2011.01)
*H04N 21/414* (2011.01)
(Continued)

(52) U.S. Cl.
CPC ... *H04N 21/2187* (2013.01); *H04N 21/42203* (2013.01)

(58) Field of Classification Search
CPC ......... A42B 3/042; G06F 3/012; G06F 3/016; H04N 21/2187; H04N 21/41407; H04N 21/42203; H04N 21/4223
See application file for complete search history.

(56) References Cited

U.S. PATENT DOCUMENTS

| | | | |
|---|---|---|---|
| 2011/0181418 A1* | 7/2011 | Mack | A42B 3/046 340/573.1 |
| 2014/0362244 A1* | 12/2014 | Martin | H04N 23/65 348/211.2 |

(Continued)

OTHER PUBLICATIONS

Patent Cooperation Treaty; Written Opinion and International Search Report, Jan. 27, 2022, cited in Application No. PCT/US21/55790, 10 pages.

*Primary Examiner* — Rong Le
(74) *Attorney, Agent, or Firm* — Shumaker, Loop & Kendrick, LLP; S. Alexander Long, Jr.; Lloyd Wilson (57) ABSTRACT

A system for communicating a plurality of sensations from a first person perspective of an athlete to one or more observers may include a head attachment device having imbedded therein a computer connected to one or more cameras, one or more microphones, and a plurality of impact sensors. The cameras, microphones, and impact sensors may be powered by a battery also imbedded in the head attachment device. The system may also include a broadcast server which may include a wireless receiver in communication with the wireless transmitter of the computer, a processor receiving video, audio, and impact signals from the computer via a receiver. The system may also include an audio/visual display device in communication with the transmitter of the broadcast server. The audio/visual display (Continued)

device may include a processor which converts signals so that the audio, video, and impact signals may be perceived by observers.

8 Claims, 8 Drawing Sheets

(51) Int. Cl.
*H04N 21/422* (2011.01)
*H04N 21/472* (2011.01)

(56) References Cited

U.S. PATENT DOCUMENTS

| | | | |
|---|---|---|---|
| 2015/0157079 A1* | 6/2015 | Auranen | F41H 1/04 |
| | | | 2/422 |
| 2015/0172605 A1* | 6/2015 | Anwar | H04N 21/21805 |
| | | | 348/159 |
| 2016/0099025 A1 | 4/2016 | Anwar et al. | |
| 2016/0366450 A1 | 12/2016 | Hamam et al. | |

* cited by examiner

SYSTEM FOR COMMUNICATING SENSATIONS FROM A FIRST PERSON PERSPECTIVE

CROSS-REFERENCE TO RELATED APPLICATIONS

This Application is a U.S. 371 national stage application tracing priority to and claiming benefit of Patent Cooperation Treaty (PCT) application Ser. No. PCT/US2021/055790, filed on Oct. 20, 2021, which traces priority to and claims benefit of U.S. Provisional Patent Application having Ser. No. 63/094,382 filed on Oct. 21, 2020, the entire contents of both of which are hereby expressly incorporated herein by reference.

TECHNICAL FIELD AND BACKGROUND OF INVENTION

Broadcasting of sporting events began with descriptions of events sent via telegraph at least as early as the 1890s. Later, the descriptions received via telegraph would be read over radio waves by local broadcast personalities. Eventually radio broadcasts featuring broadcast personalities would be transmitted live, to remote destinations. One such radio broadcast was a prizefight between Jack Dempsey and Billy Miske in September 1920. Television later added a further dimension of video to the audio signals of radio. The world's first live televised sporting event is often said to be the 1936 Summer Olympics in Berlin. Broadcasting of sporting events would continue to evolve, eventually adding color video and high definition video content.

However, one recurrent theme for well over 100 years, whether via telegraph, radio, or television broadcast has been that the broadcast of sporting events has been primarily from the third person perspective. That is, a camera, and audio capture device, if any, may be positioned a distance away from an athlete or the action in order to capture the perspective of an observer of the sport. Likewise, the content broadcast to the public has been limited to audio and video reproductions.

Accordingly, there exists a need in the art for a system of broadcasting and communicating sporting events (and other events) which allows an observer to experience sensations of the event from a first person perspective. Likewise, there is a need in the art for a system of broadcasting and communicating sporting events (and other events) which communicates more than merely video and audio content to the observer.

SUMMARY OF THE INVENTION

It is therefore an object of the present invention to provide a system of broadcasting and communicating sporting events (and other events) which allows an observer to experience sensations of the event from a first person perspective.

It is a further object of the invention to provide a system of broadcasting and communicating sporting events (and other events) which communicates sensations experienced by an athlete (or other person) beyond video and audio content to the observer.

It is a further object of the invention that the system be unobtrusive to the event and unobtrusive to the athlete or person from whose first person perspective is being communicated to observers.

These and other objects and advantages of the invention are achieved by providing a system for communicating a plurality of sensations from a first person perspective of an athlete to one or more observers. According to such a system, an embodiment may include a camera imbedded in an outer front surface of a helmet and may also include a microphone, a battery, and a wireless and receiver. Such a system may further include an audio/visual display device configured for use by the one or more observers, in communication with the wireless transmitter and receiver. The audio/video display device may include a video display screen, a speaker, and a user interface configured to control all functions of the camera and the audio/visual display device.

According to one embodiment of the invention, the audio/visual display device may be one or more of a mobile phone, a tablet computer, or a personal computer.

According to another embodiment of the invention, the system may further include a plurality of impact sensors imbedded in the helmet. The sensors may be connected to the wireless transmitter and receiver. The plurality of impact sensors may convey data to the audio/visual display device. The data may cause predefined regions of the video display screen to illuminate for a predefined period of time.

According to another embodiment of the invention, the wireless transmitter and receiver may transmit and/or receive via one or more of Wi-Fi, Bluetooth, infrared, cellular, and/or radio signal.

According to another embodiment of the invention, a system for communicating a plurality of sensations from a first person perspective of an athlete to a plurality of observers may include a head attachment device configured to removably secure to the athlete's head and to receive the plurality of sensations. The head attachment device may include a computer, imbedded in the head attachment device. The computer may have a plurality of ports and a wireless transmitter for transmitting a plurality of wireless signals. The head attachment device may also have one or more cameras, imbedded in the head attachment device. The camera may have an outer surface that is flush with an outer surface of the head attachment device, and may be connected to the computer via the plurality of ports of the computer. The head attachment device may have one or more microphones imbedded in the head attachment device and may be connected to the computer via the plurality of ports of the computer. The head attachment device may have a plurality of impact sensors imbedded in the head attachment device and may be connected to the computer via the plurality of ports of the computer. The head attachment device may have a battery imbedded in the head attachment device and the battery may be configured to supply power to the computer, the one or more camera lenses, the one or more microphones, and the plurality of impact sensors.

The system may also include a broadcast server positioned a distance from the athlete. The server may include a wireless receiver configured to be in communication with the wireless transmitter of the computer. The server may also include a processor configured to receive the signals from the computer via the wireless receiver, the signals may include images and/or video from the one or more cameras, sound from the one or more microphones, and data from the plurality of impact sensors. The server may also include a transmitter configured to transmit the signals from the processor for viewing by the plurality of observers. The system may also include an audio/visual display device configured for use by one or more of the plurality of observers. The display device may be in communication with the transmitter of the broadcast server and may include a processor configured to receive the signals from the transmitter of the broadcast server and to convert the signals so that they may be perceived by the plurality of observers. A video display screen may be configured to display the images and/or video from the one or more cameras of the head attachment device based on the signal converted by the processor. One or more audio speakers may be configured to emit sound from the one or more microphones of the head attachment device based on the signal converted by the processor. A conveying device may be configured to convey data from the plurality of impact sensors based on the signal converted by the processor.

According to another embodiment of the invention, the head attachment device may be a helmet having cushioning which may be worn by a person such as an athlete.

According to another embodiment of the invention, the head attachment device may be an elastic headband which may be worn by a person such as an athlete.

According to another embodiment of the invention, the conveying device may include one or more predefined regions of the video display screen configured to illuminate upon receipt of the signal converted by the processor.

According to another embodiment of the invention, the wireless transmitter may transmit via one or more of Wi-Fi, Bluetooth, infrared, cellular, and/or radio signal.

BRIEF DESCRIPTION OF THE DRAWING FIGURES

The present invention is best understood when the following detailed description of the invention is read with reference to the accompanying drawings, in which.

DETAILED DESCRIPTION

Figure 1:
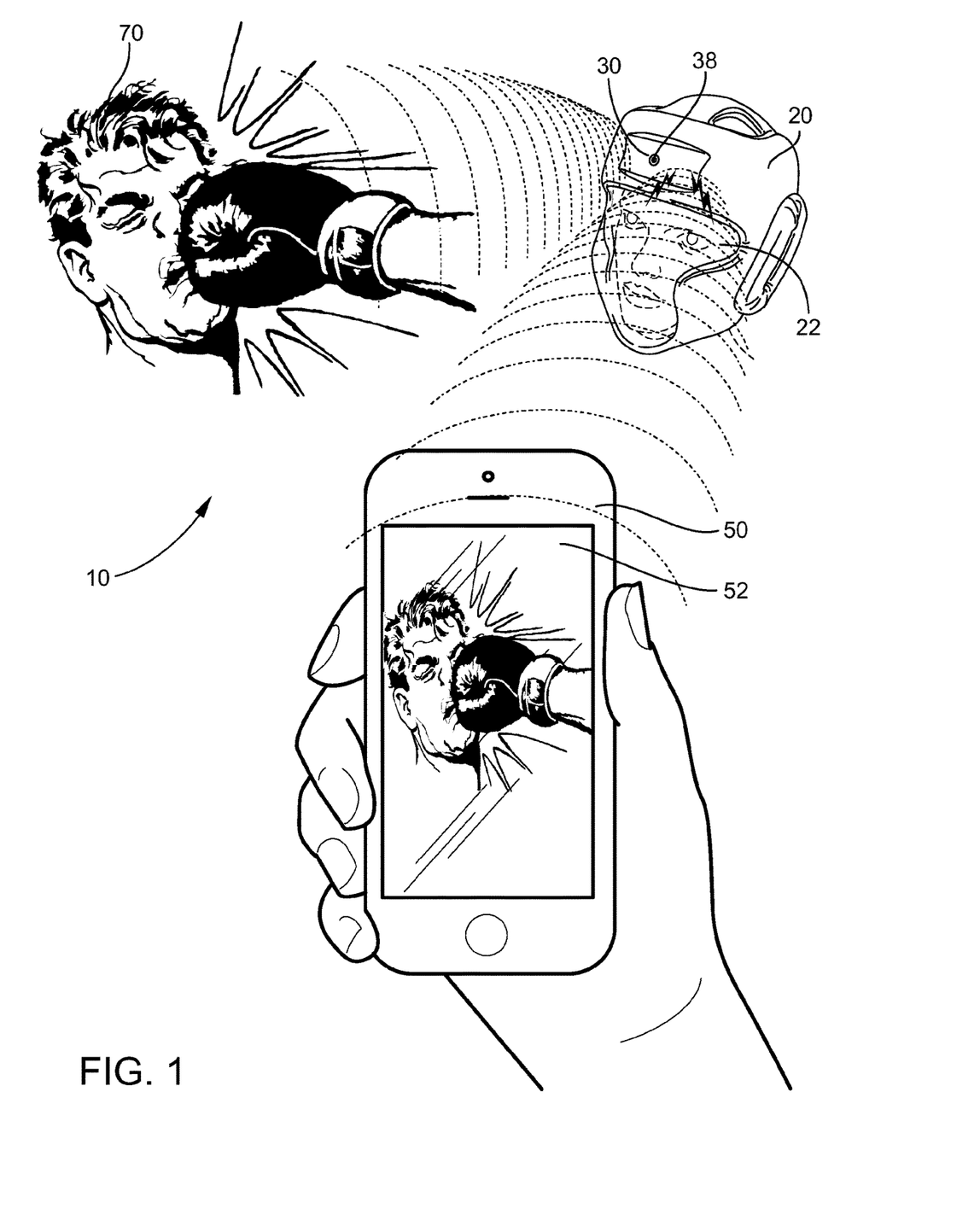
FIG. 1 is a perspective view showing an embodiment of the invention.
Figure 2:
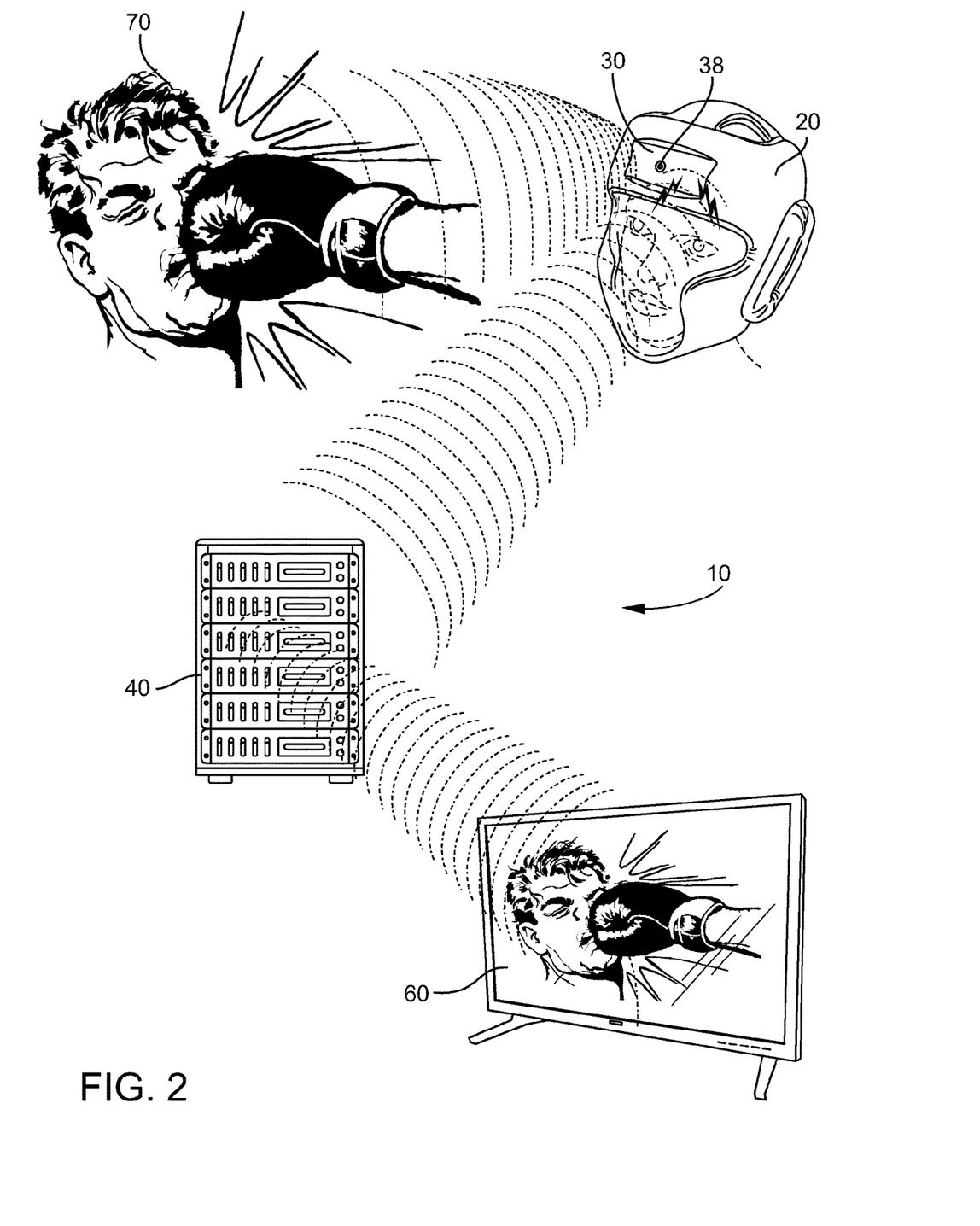
FIG. 2 is a perspective view showing an embodiment of the invention.

Referring now to the drawings, FIGS. 1 and 2 show a system 10, according to the present invention, for communicating a plurality of sensations from a first person perspective of an athlete to a plurality of observers.

As shown in FIGS. 1 and 2, a system 10 for communicating a plurality of sensations from a first person perspective of an athlete to a plurality of observers may include a padded helmet 20 worn by an athlete 22. The athlete 22 will observe via the athlete's senses the environment 70 around the athlete such as the boxer shown. One of ordinary skill in the art will recognize that the environment 70 might be an athletic field, a sports court, a gym, a boxing ring, a race track, a body of water and many other such venues. The helmet 20 will have imbedded therein a computer 30. The computer 30 will be connected to a camera lens 38 and other sensory devices such as microphones 32 and impact sensors 34 as shown in FIGS. 3-6 and discussed further below. The computer 30 receives signals from the sensors such as the lens 38. The computer 30 is in wireless communication with a portable audio/video device 50 as shown in FIG. 1. The portable audio/video device 50 may be a mobile phone, a tablet computer, a laptop computer, a personal computer, a smart television, or other similar device having wireless communication and display functions. The wireless communication may be via Bluetooth but one may also be via Wi-Fi, infrared, cellular, and/or radio signal. The audio/video device 50 is configured to display senses as perceived by the athlete 22 on a display screen 52 of the audio/video device 50. The audio/video device 50 may also have the ability to control all functions of the computer 30 such as via a graphical user interface (not shown).

The embodiment shown in FIG. 2 is similar to the embodiment shown in FIG. 1 except that a server 40 is in direct communication with the computer 30. Like the audio/video device 50 of FIG. 1, the server of FIG. 2 is in communication with the computer 30. The server 40 may control all functions of the computer 30 and may relay the data wirelessly received from the computer 30 to a display device 60. The communication from the server to the display device 60 may be wirelessly communicated as shown but a wired connection, such as via a coaxial cable, fiber optic cable, CAT5 cable, HDMI cable, and similar wired connections may be utilized. The display device 60 will communicate all data transmitted by the computer 30 to an observer. Such data may include images received via a camera lens 38, audio received via microphones 32, and impact data from impact sensors 34.

Referring now to FIGS. 3 through 8, the helmet 20 as worn by athlete 22 is shown in greater detail. One of skill in the art will recognize that the helmet 20 may comprise any number of different types and styles of helmets such as used in boxing, wrestling, equestrian, football, baseball, hockey, racing, cycling, lacrosse, and other sports. As shown, the head gear/helmet 20 is made from leather and includes padded protection for the head of the athlete 22. The padding may include one or more slabs of impact attenuating foam which may aid in shock absorption in protecting the head. The helmet 20 may attach to the athlete's head via friction alone or may utilize strapping which may attach with hook and loop fasteners, snaps, lacing, buckles, and other devices. The helmet may include removable face guards (not shown) and other attachments for safety of the athlete 22.

As shown in FIGS. 3 through 8, the computer 30 may be imbedded in the helmet 20. The computer 30 may have lens 38. Microphones 32 may be attached directly to the computer as shown but may also be imbedded in peripheral areas of the helmet 20 and connected via wires to the computer 30. The camera lens 38 is preferably capable of capturing high definition video such as 1080P or 4 k or higher definition. The camera 38 is preferably impact resistant and durable such that it can withstand the wear and tear implicated by various athletic uses. The camera 38 is also preferably small and lightweight. In one exemplary embodiment, the camera 38 is coupled directly to the computer 30. According to such an embodiment, the camera 38 and computer 30 combination have dimensions of 1.5 inches by 1.5 inches by 0.9 inches. According to such an embodiment, the camera 38 and computer 30 combination have a weight of less than 1.0 oz. The camera 38 and computer 30 may be waterproof up to 30 meters under water. The camera 38 and computer 30 may record video in 1920×1080P HD at 30 FPS.

Figure 3:
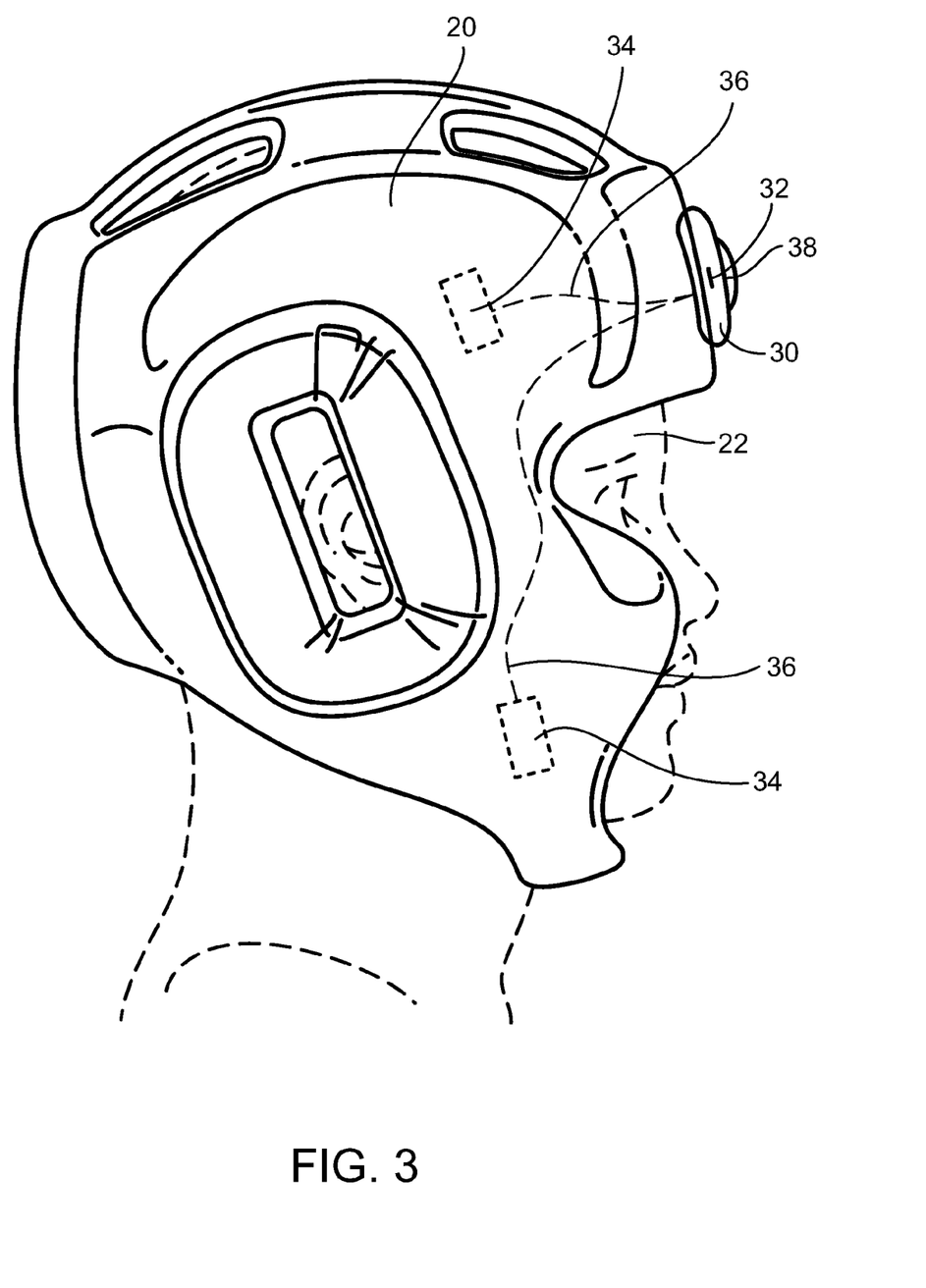
FIG. 3 is a right side view of an embodiment of the invention shown on an athlete.
Figure 4:
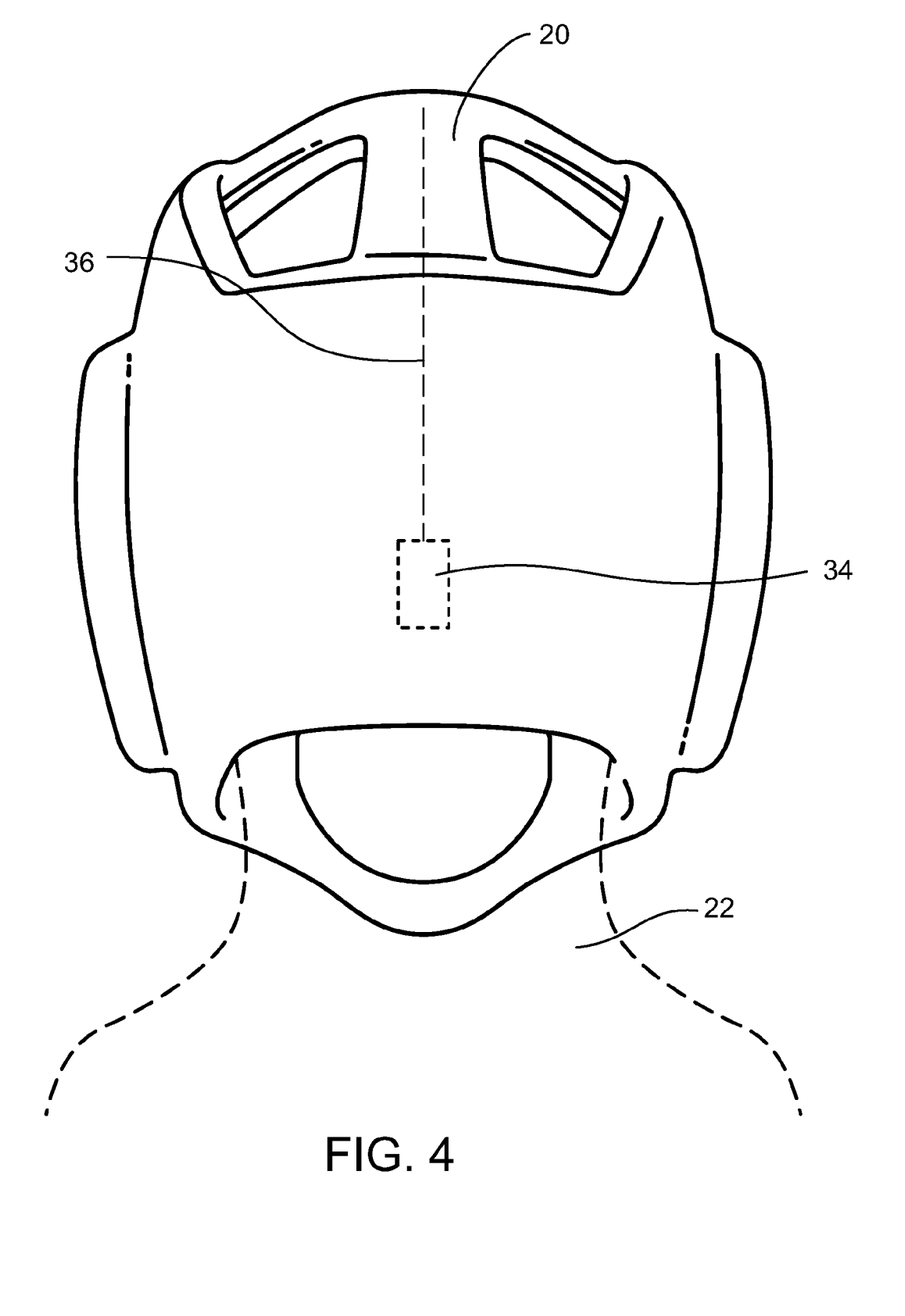
FIG. 4 is a rear view of an embodiment of the invention shown on an athlete.
Figure 5:
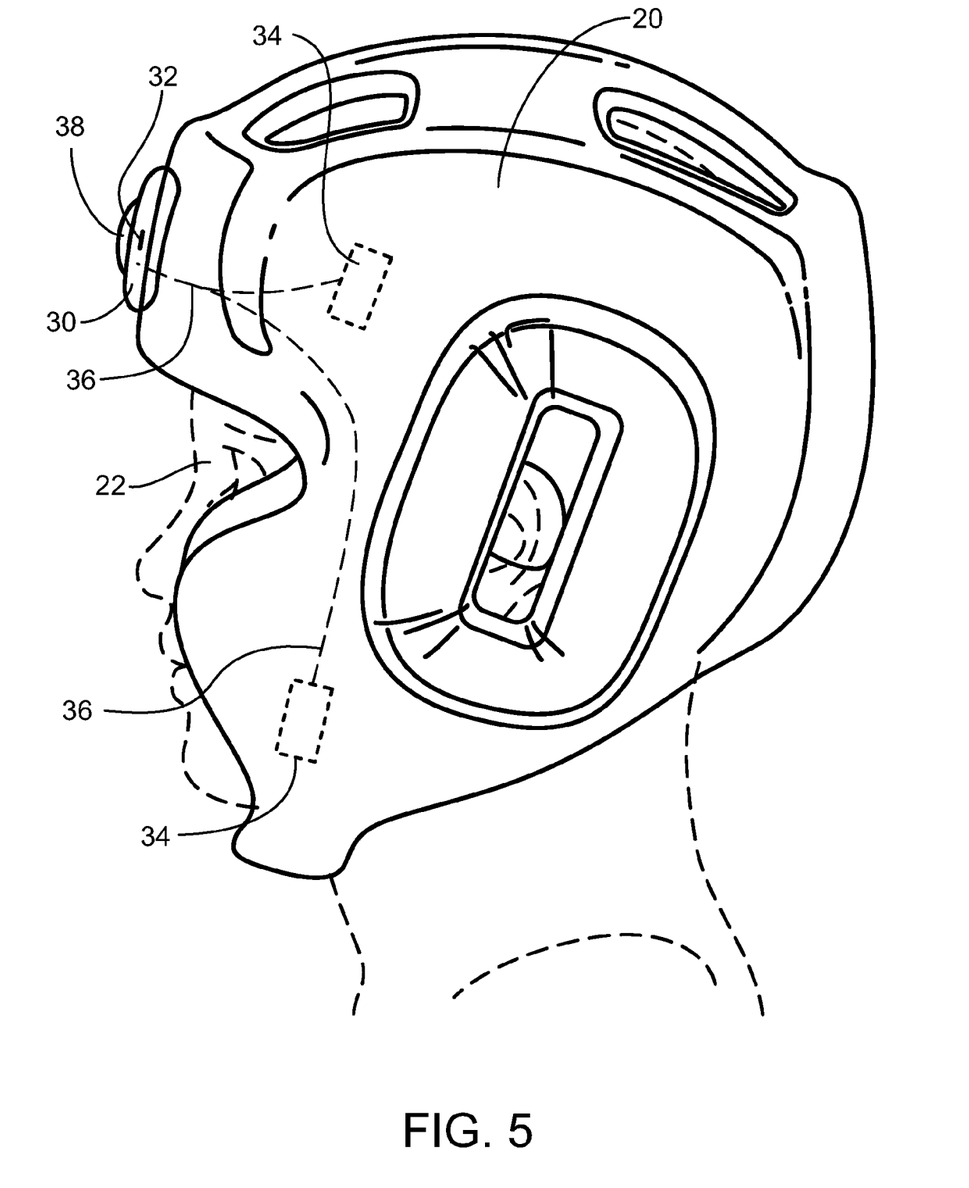
FIG. 5 is a left side view of an embodiment of the invention shown on an athlete.
Figure 6:
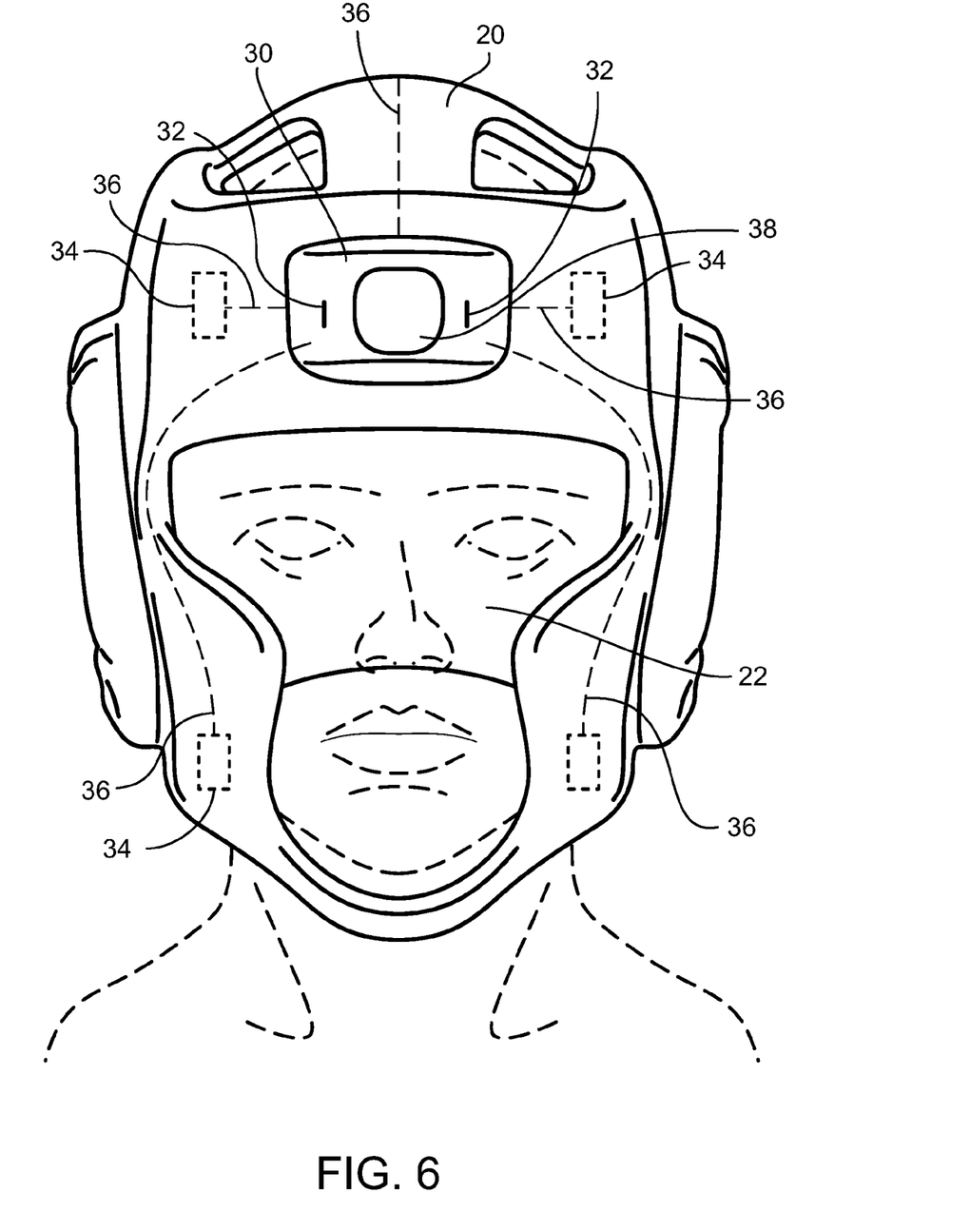
FIG. 6 is a front side view of an embodiment of the invention shown an athlete.
Figure 7:
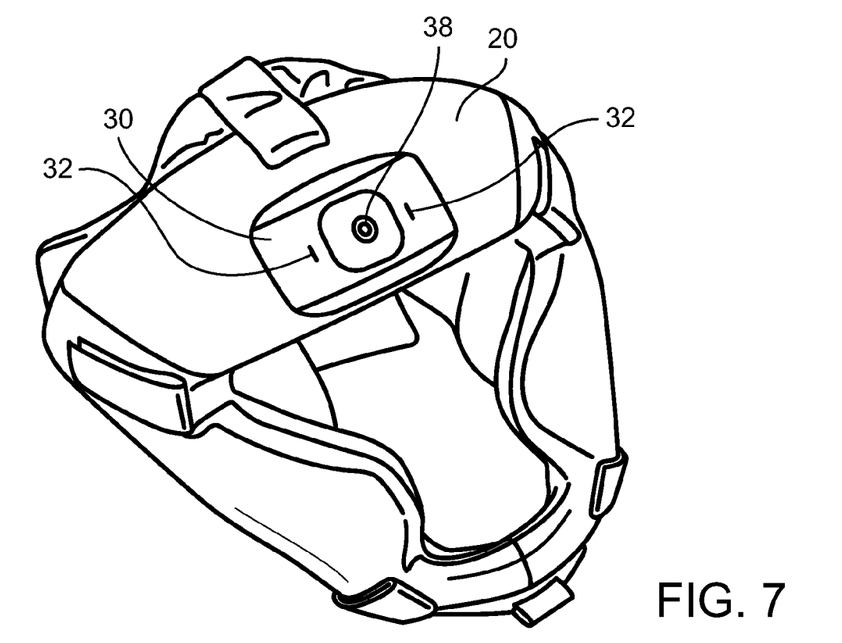
FIG. 7 is a perspective view of an embodiment of the invention.
Figure 8:
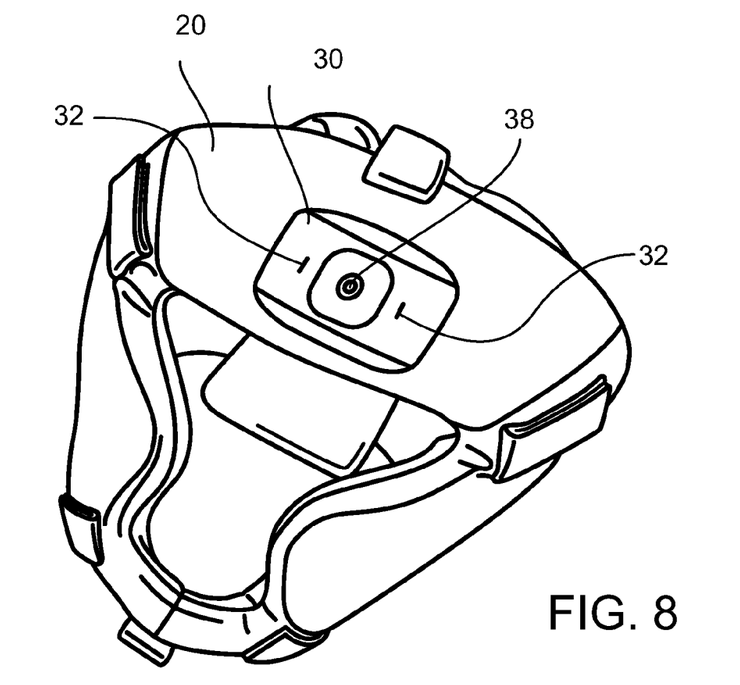
FIG. 8 is a perspective view of an embodiment of the invention.

As shown in FIGS. 3 through 8, the helmet 20 may also have imbedded therein multiple impact sensors 34. Preferably, these impact sensors 34 are within the helmet and not visible on the outside of the helmet 20. The impact sensors 34 may have a wired connection 36 to the computer 30. The impact sensors 34 may be designed to sense and transmit a signal to the computer 30 upon sensing an impact. For instance, where the helmet is used in boxing, the impact sensor 34 will sense when a blow is made to the area of the helmet 20 where the particular impact sensor 34 is located. This sensor 34 will relay that data to the computer 30 which then sends the signal to the server 40 as shown in FIG. 2 or to the audio/visual device 50 as shown in FIG. 1. As shown in FIG. 3, impact sensor 34 may be located near the right temple of the athlete 22 and near the right jaw or chin of the athlete. As shown in FIG. 4, an impact sensor 34 may be located on a rear of the helmet. As shown in FIG. 5, impact sensor 34 may be located near the left temple of the athlete 22 and near the left jaw or chin of the athlete. As shown in FIG. 6 impact sensor 34 may be disposed to the left and right of the mouth of the athlete 22 and the left and right forehead of the athlete. One of skill in the art will appreciate that impact sensor 34 may be positioned in different areas on the helmet 20 depending on the particular sport and particular sensation to be conveyed to the observer. For instance, an impact sensor 34 may be positioned on a top of a helmet 20 where in order to convey the impact of the crown of the helmet impacting a surface, such as when a football player "targets" an opposing player.

In one embodiment, when the signal from the impact sensor 34 is conveyed to the server 40 or audio/visual device 50, an output of the impact sensor 34 is communicated to the third party observer so that he or she can perceive the impact experienced by the athlete 22. The data may be displayed on screen 50 or 60 and may be in the form of an area of the screen that illuminates. For instance, if an impact sensor 34 located on a left side of the helmet 20 receives an impact from a boxer, a left side of the screen 50 or 60 may illuminated. By way of another example, a speaker on the audio/video device 50, 60 may impart a sound signaling the impact. By way of another example, the audio/video device 50, 60, may have vibration functions such that the device may vibrate in response to a signal received from the impact sensor 34.

Figure 9:
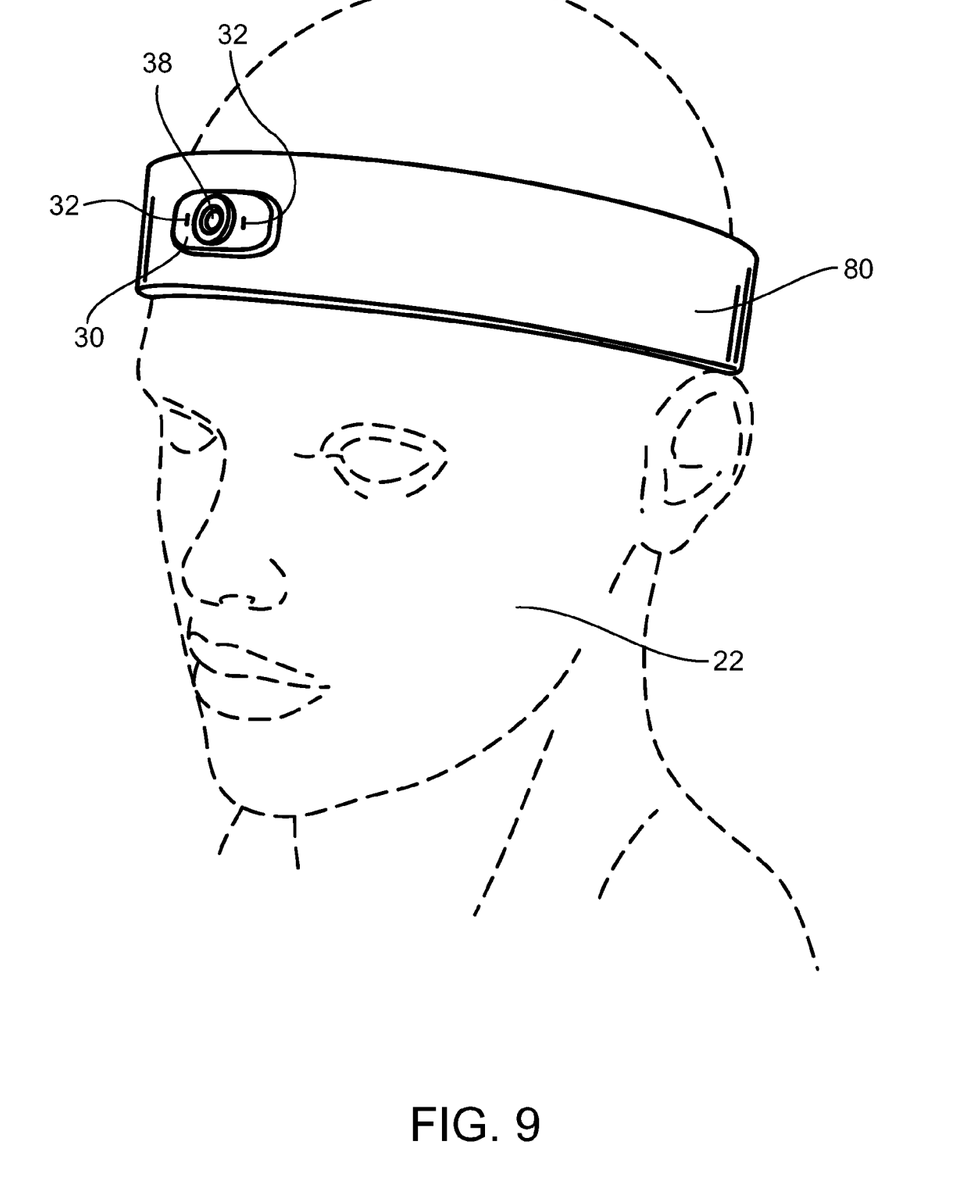
FIG. 9 is a front side perspective view of an embodiment of the invention.

Referring now to FIG. 9, according to a further embodiment of the invention, one of skill in the art will understand that the term helmet 20 as used in FIGS. 1 through 8 connotes impact protection for the athlete. However, the invention further contemplates that suitable headgear may include a headband 80 as shown in FIG. 9. The headband 80 may be worn by an athlete 22. As shown in FIG. 9, the headband 80 may have a computer 30 imbedded in the headband 80. The computer 30 may have microphones 32 attached directly to the computer 30 and have a camera lens 38 attached directly to the computer 30. The headband 80 may be made of fabric and have elastomeric properties for securing to the head of the athlete 22. The headband 80 may also serve to absorb moisture.

The foregoing has described a system 10 for communicating a plurality of sensations from a first person perspective of an athlete to a plurality of observers. While specific embodiments of the present invention have been described, it will be apparent to those skilled in the art that various modifications thereto can be made without departing from the spirit and scope of the invention. Accordingly, the foregoing description of the invention and the best mode for practicing the invention are provided for the purpose of illustration only and not for the purpose of limitation.

What is claimed is:

1. A system for communicating a plurality of sensations from a first person perspective of an athlete to an audio/visual display device, the system comprising:
   a computer imbedded a helmet of the athlete, the computer being operatively coupled to:
   a) at least two cameras imbedded in the helmet, the at least two cameras including a camera imbedded in an outer front surface of the helmet;
   b) one or more microphones coupled to the helmet;
   c) impact sensors located at a plurality of locations within the helmet the impact sensors being configured to communicate impact applied to the helmet,
   d) a battery; and
   e) a wireless transmitter and receiver;
   an audio/visual display device in wireless communication with the wireless transmitter and receiver, the audio/visual display device being configured for use by one or more observers of the athlete, comprising a video display screen, a speaker, and a user interface configured to control all functions of the computer;
   wherein computer transmits data from the wireless transmitter to the audio/visual display device the plurality of sensations from at least the at least one camera, the one or more microphones, and the impact sensors;
   wherein the data causes predefined regions of the video display screen to illuminate for a predefined period of time, the predefined regions that are illuminating corresponding to respect locations of the helmet where the impact sensors that are receiving impact are located.

2. The system of claim 1 wherein the audio/visual display device is one or more of a mobile phone, a tablet computer, or a personal computer.

3. The system of claim 1 wherein the wireless transmitter and receiver transmits and receives via one or more of Wi-Fi, Bluetooth, infrared, cellular, and/or radio signal.

4. A system for communicating a plurality of sensations from a first person perspective of an athlete to an audio/visual display device, the system comprising:
   a) a head attachment device, configured to removably secure to the athlete's head and to receive the plurality of sensations, the head attachment device comprising:
   a computer, imbedded in the head attachment device, the computer having a plurality of ports and a wireless transmitter for transmitting a plurality of wireless signals;
   at least two cameras, imbedded in the head attachment device, at leas one camera of the at least two cameras having an outer surface that is flush with an outer surface of the head attachment device, the one or more cameras being connected to the computer via one or more of the plurality of ports of the computer;
   one or more microphones imbedded in the head attachment device and connected to the computer via at least one of the plurality of ports of the computer;
   a plurality of impact sensors, imbedded in a plurality of locations within the head attachment device, connected to the computer via a port of the plurality of ports of the computer, the plurality of pact sensors being configured to communicate impact applied to the head attachment device; and
   a battery, imbedded in the head attachment device, configured to supply power to the computer, the camera lenses of the at least two cameras, the one or more microphones, and the plurality of impact sensors;

b) a broadcast server positioned a distance from the athlete and comprising:
a wireless receiver configured to be in communication with the wireless transmitter of the computer;
a processor configured to receive the signals from the computer via the wireless receiver, the signals comprising:
image data of images and/or video captured by the one or more cameras;
sound data from the one or more microphones; and
impact data from the plurality of impact sensors;
a transmitter configured to transmit the signals from the processor for viewing via the audio/visual display device; and c) the audio/visual display device configured for use by one or more of a plurality of observers of the athlete, herein the audio/visual display device is in wireless communication with the transmitter of the broadcast server, the audio/visual display device comprising:
a processor configured to receive the signals from the transmitter of the broadcast server and to convert the signals so that they may be perceived by the plurality of observers;
a video display screen configured to display the images and/or video from the one or more cameras of the head attachment device based on the signal converted by the processor;
one or more audio speakers configured to emit sound from the one or more microphones of the head attachment device based on the signal converted by the processor; and
a conveying device configured to convey data from the plurality of impact sensors based on the signal converted by the processor, wherein the signals cause the conveying device to illuminate predefined regions of the video display screen for a predefined period of time, wherein the predefined regions that are illuminating corresponding to respective locations of the head attachment device where the impact sensors that are receiving impact are located.

5. The system of claim 4 wherein the head attachment device is a helmet having cushioning.

6. The system of claim 4 wherein the head attachment device is an elastic headband.

7. The system of claim 4 wherein the wireless transmitter transmits via one or more of Wi-Fi, Bluetooth, infrared, cellular, and/or radio signal.

8. A method, comprising:
receiving, by a processor of an audio/video display device, one or more signals comprising impact data from one or more impact sensors of a head attachment device being used by an athlete, the impact data representing impact sensed by the one or more impact sensors in response to the impact;
displaying, via a screen of the audio/video display device, one or more outputs of the impact data, the one or more outputs including an illumination of a portion of the screen, wherein the portion of the screen that is illuminated corresponds to a portion of the athlete that impacted; and
providing, via the audio/video display device, one or more vibration functions for vibrating the audio/video display device in response to the impact data.

\* \* \* \* \*

UNITED STATES PATENT AND TRADEMARK OFFICE
CERTIFICATE OF CORRECTION

PATENT NO. : 12,250,416 B2
APPLICATION NO. : 18/249961
DATED : March 11, 2025
INVENTOR(S) : Michael Choren et al.

It is certified that error appears in the above-identified patent and that said Letters Patent is hereby corrected as shown below:

In the Claims

Claim 4, Column 6, Line 53, should read --device, at least one camera of the at least two cameras--

Claim 4, Column 7, Line 20, should read --wherein the audio/visual display device is in wireless--

Signed and Sealed this
Twenty-second Day of July, 2025

Coke Morgan Stewart
*Acting Director of the United States Patent and Trademark Office*